United States Patent

[11] 3,634,822

[72] Inventor Chao K. Chow
Chappaqua, N.Y.
[21] Appl. No. 791,222
[22] Filed Jan. 15, 1969
[45] Patented Jan. 11, 1972
[73] Assignee International Business Machines Corporation
Armonk, N.Y.

[54] METHOD AND APPARATUS FOR STYLE AND SPECIMEN IDENTIFICATION
11 Claims, 7 Drawing Figs.

[52] U.S. Cl. .......... 340/146.3 S
[51] Int. Cl. .......... G06k 9/00
[50] Field of Search .......... 340/146.3; 179/1 SA:1 SB, 1 VC, 1 VS

[56] References Cited

UNITED STATES PATENTS

| | | | |
|---|---|---|---|
| 3,167,746 | 1/1965 | Reines et al. .......... | 340/146.3 |
| 3,188,609 | 6/1965 | Harmon et al. .......... | 340/146.3 X |
| 3,341,814 | 9/1967 | Chow .......... | 340/146.3 S |

OTHER REFERENCES

Liu et al., IBM Technical Disclosure Bulletin, " Character Recognition Method Employing Two-Level Decision Process," Vol. 8, No. 6, November, 1965. p. 867.

Stevens, National Bureau of Standards Technical Note 112, " Automatic Character Recognition— A State of the Art Report," May, 1961. pp. 109- 113, 152.

*Primary Examiner*—Maynard R. Wilbur
*Assistant Examiner*—Leo H. Boudreau
*Attorneys*—Hanifin and Jancin and John E. Dougherty, Jr.

ABSTRACT: The character recognition system identifies characters in each of three different fonts. Each character is scanned to obtain a binary word representation of the character. This representation is applied to three tables storing probability representations for each known character in the three fonts. Character comparison functions for each character in each font are produced which are stored in a buffer for later character identification and are also applied to three accumulators to provide three font comparison functions for the unknown character. From these functions the font is determined without, at that time, identifying the character. The results of a series of font identifications for a sequence of unknown characters are stored on a current basis, and from these results, font frequency functions are derived which are then employed to modify the character comparison functions that have been stored in the buffer. The modified character comparison functions are compared to identify the unknown character.

INVENTOR
CHAO K. CHOW
BY John E. Dougherty Jr.
ATTORNEY

METHOD AND APPARATUS FOR STYLE AND SPECIMEN IDENTIFICATION

BACKGROUND OF THE INVENTION

This invention relates in its most general sense to the identification of different classes of specimens which come from different sources or styles. Thus, it is meant to encompass not only the identification of alphabetic and numeric characters recorded in different fonts, but also, for example, similar applications such as the identification of speech recorded in a number of different styles or from a number of different speakers, or classes of speakers such as, for example, men and women.

Character recognition methods and apparatus are, of course, well known in the art and systems and methods have been proposed in which characters recorded in different fonts may be recognized. One such system is shown in U.S. Pat. No. 3,167,746, issued on Jan. 26, 1965. Most such systems base the character recognition on functions for the unknown character derived from comparisons with all the characters in all the different fonts, and base the font identification on the results of the character identification.

SUMMARY OF THE INVENTION

In accordance with the principles of the present invention, a completely adaptive method and system is provided for recognizing characters (specimens) recorded in a number of different fonts (styles). In accordance with these principles the individual characters are not identified initially. Rather, the characters in the sequence of unknown characters are first analyzed against stored representations of the characters in the different fonts and using all of the resulting information for each font, the font for the particular character is determined without at that time identifying the character. The results of a series of font determinations are stored and from these results there are derived frequency functions from all of the fonts. These font frequency functions are changed on a continuing basis to reflect the font determinations for a fixed number of characters (e.g., 101 characters) and are weighted to give more emphasis to the font determinations for the centrally located character in the sequence. The actual character identification is based upon a comparison of character comparison functions realized by a comparison of the unknown character with the stored representations of all the characters in each of the different fonts. This character identification comparison is controlled by the font frequency functions which have already been derived. The character comparison functions for an unknown character are not presented for character identification until the font frequency functions based upon that character and a number of characters succeeding and preceding it on the sequence of unknown characters have been derived.

In the preferred embodiment of the invention disclosed in this application the character comparison functions used for identification are obtained during the comparison used to generate the font determinations. These character comparison functions are stored in a buffer until the appropriate font frequency functions have been obtained. These latter functions are used to modify the character comparison functions in all three fonts and the total information is used in the character identification process.

It is also within the broad scope of the invention to employ different comparison techniques for font and character identification and to rescan the characters for character identification after font frequency functions have been obtained. Further, though the preferred system of continuously generating font frequency functions, with special weight being attached to the font determinations of the characters immediately succeeding and preceding the unknown character which is to be identified using those particular font comparison functions, is most advantageous in a completely adaptive system which can identify characters in which the font may change for even a few words, this degree of sophistication is not necessary for all applications, Thus, the font frequency functions may be generated on a less continuous basis and may be employed to merely select a particular font prior to the character identification.

Therefore, it is an object of the present invention to provide a completely adaptive method of identifying specimens (characters) recorded in a number of different styles (fonts).

Another object is to provide an improved multifont character identification method and system in which characters can be identified even though there are many changes in the fonts in which the characters are recorded.

Still another object is to provide an improved multifont character recognition system and method in which both the fonts and characters are identified using the total information stored on the known characters in the different fonts.

Still another object is to provide an improved multifont character recognition system and method in which the fonts for the various characters are determined prior to the actual character identification.

A further object is to provide an improved multifont character recognition system and method which is capable of identifying characters recorded in fonts which differ from the fonts on which information is stored in the machine.

These and other objects, features and advantages of the invention will be apparent from the following more particular description of preferred embodiments of the invention, as illustrated in the accompanying drawings.

IN THE DRAWINGS

FIG. 2 is a diagram indicating the manner in which FIGS. 2A–2E are organized.

Figures 2, 2A:
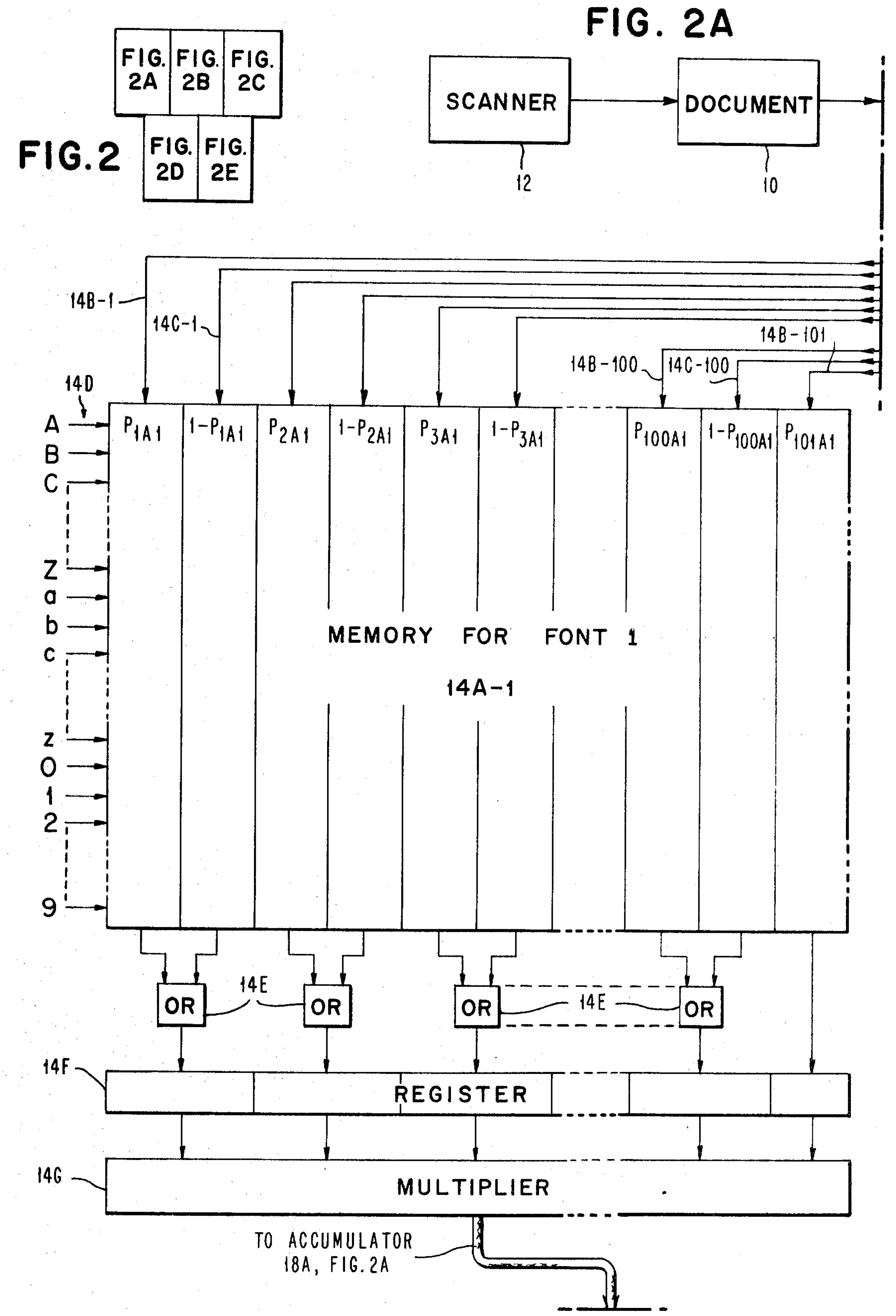

FIGS. 2A, 2B, 2C, 2D and 2E, taken together as indicated in FIG. 2, illustrate an embodiment of a system for identifying font and character in accordance with the principles of the subject invention.

Figure 1:
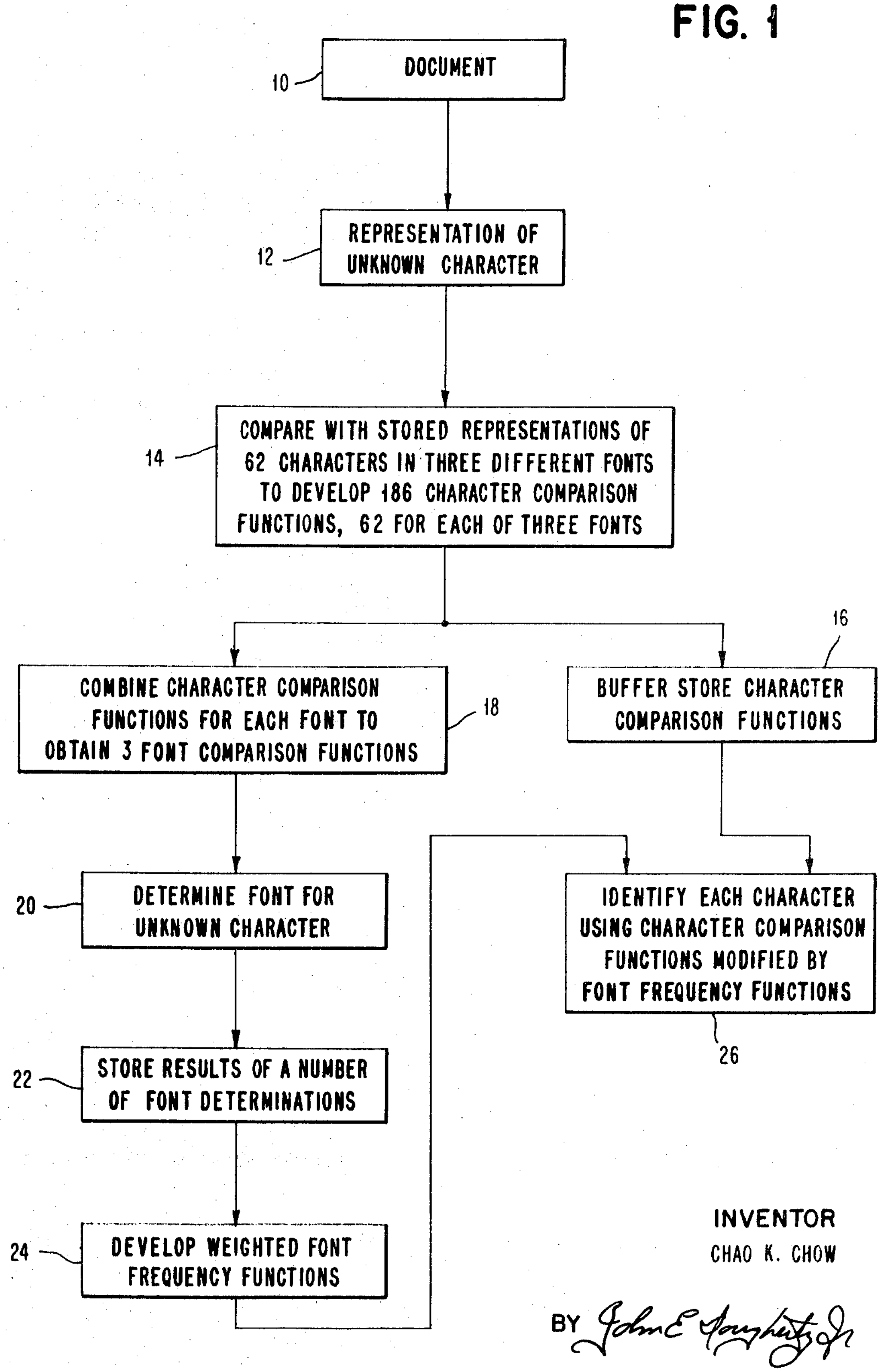
FIG. 1 is a block diagram representation of steps performed in carrying out the inventive method.

FIG. 1 is a block diagram representation of the steps involved in identifying characters from three different fonts. The method as depicted in the flow chart of FIG. 1 is specific to the mode of operation of the system for carrying out the method shown in FIGS. 2A through 2E. The document on which the characters to be identified are recorded is represented by a block 10 in FIG. 1. Each character is scanned to obtain a representation of the character, which is here a 100-bit binary word, shown at a block 12. There are stored, in the machine, representations of all of the characters in a set in each of three different fonts. There are 62 characters in each set, capital letters A through Z, small letters *a* through *z*, and numerals 0 through 9.

The stored representations are conditional probabilities of binary one and binary zero in each of the 100 binary positions used to represent a character. These probabilities are obtained from employing the system to recognize a plurality of known characters recorded from different instruments in each font and keeping statistics on the occurrences of binary ones and zeros in the 100 binary positions. For example, if the results of prior tests and analyses reveal that the first binary position for a capital T is a binary one 95 percent of the time, then the stored conditional probability for binary one in that position is 0.95 and the stored conditional probability for binary zero in that position is 1–0.95, or 0.05. Thus, for each character, in each font, there are stored 200 conditional probabilities, specifically the probability for a binary one and a binary zero to be produced by the scanning operation in each of the 100 binary positions used to represent a character. These conditional probabilities are, as stated above, derived prior to the actual character identification of unknown characters and are stored in the character recognition machine used to carry out the process.

The representation of the unknown character, block 12 in FIG. 1, is applied to the storage media in which the conditional probabilities for the 62 characters in each font are stored to derive character comparison functions for each character in each font (block 14). The binary ones and zeros in the 100-bit representation of the unknown character are employed to first select the stored conditional probability value for one or zero in each of the 100 positions for the first character (capital A) in each font. This selection is carried out in parallel in the disclosed embodiment but may be done serially.

The 100 conditional probabilities for the first character (capital A) in each font are separately multiplied to obtain three character comparison functions for the unknown character, based on the stored information on the character, capital A, in each of the three fonts. There is also stored with the conditional probabilities for each character a factor based upon the frequency of occurrence of that character in normal text. This factor is included in the multiplication to obtain the character comparison function for each character. This operation is repeated for each of the 62 characters in the set. These character comparison functions are separately stored in a buffer 16 for later use in character identification, and are also applied to three accumulators, one for each font, in which the 62 character comparison functions for each character are combined.

Upon completion of the62 comparison operations as described above, the accumulated sums of the combined character comparison functions in the three fonts are compared to determine which sum is largest and thereby determine the font for the particular character (block 20). It should be noted here that this font determination is made without making any attempt to identify the character, and it is based upon a comparison of the unknown character with the stored information on all the characters in each font. In this way, all of the font information stored is used and tests results have shown that reliable font identification is achieved. The results of the font determination are stored in a register represented by a block 22.

It should also be noted that the font determination, though reliable, is not completely foolproof and that errors can occur as the result of faulty printing of characters or other failures of the system. However, as will be apparent from the description to follow the method of the invention is particularly designed to produce proper character identification even in the presence of some faults of this type.

The steps of the method, as described above, with reference to blocks 10, 12, 14, 18, 20 and 22, are repeated for each unknown character and the results of the font determinations for a fixed number of characters are stored. Assuming, for example, in 101 such font determinations, the first font was determined 80 times, the second font 15 times and the third font six times, the values 80, 15, and 6 representative of the last 101 font determinations are stored. These values are stored on a current basis for the last 101 font determinations and from them, after each font determination, three weighted font frequency functions are derived (block 24).

These weighted font frequency functions are used in the actual character identification operation (block 26). The buffer store 16 in which the character comparison functions for each particular unknown character are stored, 62 such functions for each font, delivers these functions for actual character identification after a sufficient delay to allow for the font determination to be made on the 50 characters following the particular unknown character in the sequence of characters to be identified. As stated above, the weighted frequency functions sued for each character identification are based upon 101 font determinations. After the above-described delay in the buffer store 16, the character identification for each particular unknown character is carried out using the font frequency functions based upon the font determination for the particular character and the font determination for the 50 characters preceding it and the 50 characters succeeding it in the sequence of unknown characters to be identified.

The actual identification process makes use of all of the character comparison functions in each font. Specifically, the 62 character comparison functions for each unknown character in each font are first multiplied by the appropriate font frequency function developed for that font. Then the thus modified character comparison functions for the same character in each font are summed to obtain 62 such sums one for each of the characters in the set. Finally, these 62 sums are compared to determine which is the largest and the particular unknown character is identified.

As stated above and indicated by block 24 in FIG. 1, the font frequency functions used to control or modify the actual character identification are weighted functions. Each group of three font frequency functions is based upon the font determinations for 101 sequential characters and these three functions are used to identify the centrally located character in that sequence, that is the 51st character. In order to provide for situations in which there is a change in fonts for a smaller number of characters, more weight is given to the font determinations for the characters immediately adjacent the centrally located character in the sequence. This can be accomplished directly by the decoding circuitry used to generate the font frequency functions, or separately by multiplying the font determinations for a specific number of characters on either side of the central character by two. For example, the number of font determinations in each font for the 46th through the 56th characters are multiplied by two to give more weight to these determinations. More sophisticated weighting schemes are also usable in which all of the font determinations are given different weights depending upon their proximity to the unknown character, which is the 51st character in the sequence.

It is also apparent that during the recognition of the first 50 characters and the last 50 characters in a sequence of characters to be identified, the font frequency functions are necessarily limited to a smaller number of font determinations. The first character is identified using font frequency functions based upon the font determinations of that character and the 50 characters succeeding it in the sequence, whereas the last character is identified using font frequency functions based upon font frequency determinations for that character and the 50 characters preceding it in the sequence.

FIGS. 2A through 2E, taken together as indicated in FIG. 2, show a system for practicing the method described above with reference to FIG. 1. The document containing the printed text to be scanned is again designated 10 in FIG. 2A. Insofar as possible the designations used to identify the components in FIGS. 2A–2E will be preceding by the numerals 10 through 26 used in FIG. 1 to key the structure to the functional steps of the method. The document is scanned using a conventional scanner 12A (FIG. 2A) and detector 12B to obtain for each unknown character scanned a 100-bit binary vector or word which is stored in a register 12C. Register 12C is shown to include 101 binary flip-flop stages 12C–1 through 12C–101. The last flip-flop 12C–101 always stores a binary one for reasons to be explained below. The other 100 flip-flops in register 12C are set in a binary one or a binary zero state according to the binary values developed by the scanning of the unknown character. Each of these flip-flop stages has a one output 12D (1 to 100) and a zero output 12E (1 to 100) one of which is energized according to whether the flip-flop is storing a one or a zero. The last stage flip-flop 12C–101 has only a binary one output 12D–101.

The outputs of register 12C on lines 12D and 12E are applied in parallel as inputs to three memories 14–1, 14A–2, 14A–3, (FIGS. 2A, 2B, 2C), one for each of three different fonts. These memories store the conditional probabilities for binary ones and zeros in the 100 positions for each of the 62 characters in the character set. The binary one inputs to the three memories 14A–1, 14A–2 and 14A–3 are designated 14B–1 through 14B–101 and the binary zero inputs 14C–1 through 14C–100.

Each of the memories 14A–1, 14A–2, 14A–3 has 62 rows, one for storing the conditional probabilities on each of the 62 characters in the set (capital letter A–Z, small letter *a–z*, numerals 0–9). FIG. 2A, the probabilities for the first letter, capital A, in the first font are represented within the block 14A–1, The value $P_{1A1}$ denotes the conditional probability that there will be a binary one in the first position in register 12C when a capital A in font 1 is canned. The value $1-P_{1A1}$ denotes the conditional probability that there will be a binary zero in the same position. The other values $P_{2A1}$ through $1-P_{100A1}$ represent the probabilities for binary ones and zeros in the other positions for a capital A. The last position in the first row stores a value $P_{101A1}$ which is not related to the word representation but is a frequency factor determined by the frequency with which the particular letter occurs in normal text. Thus, the frequency factor for the letter "*e*" would be high and for the letter "*z*" would be low.

When the binary word representation of an unknown character has been placed in register 12C, signals are applied in parallel to the three memories 14A–1, 14A–2, and 14A–3, on the appropriate binary one and zero input lines, 14B–1 or 14C–1 through 14B–100 or 14C–100. The line 14B–101 for the last column in which the character frequency functions are stored is energized for each operation regardless of the input from detector 12B to register 12C.

The operation of the three memories 14A–1, 14A–2 and 14A–3 is the same and the description for memory 14A–1 will therefore suffice. There are 62 row drive lines 14D for this memory, one for each of the 62 characters in the set. These lines are energized in sequence in conjunction with the signal applied to the selected column input lines 14B–1, or 14C–1, etc. As each line 14D is energized the appropriate conditional probabilities for the corresponding known character, as well as the frequency function for that character, are read out of the memory, and passed through OR circuits 14E to an output register 14F. When each group of conditional probability values is registered in the register, they are read out in sequence including the character frequency function and multiplied by each other in a multiplier 14G.

Assuming the binary values in the shift register 12C in the first, second, third and 100th positions were 101----1, the product produced by the multiplier operation 14G for capital letter A can be represented as $(P_{1A1})$ $(1-P_{2A1})$ $(P_{3A1})$ --- $(P_{100A1})$ $(P_{10A1})$. This product is termed the character comparison function for the unknown character as compared against the stored representation for the capital letter A in the first font.

Figure 2B:
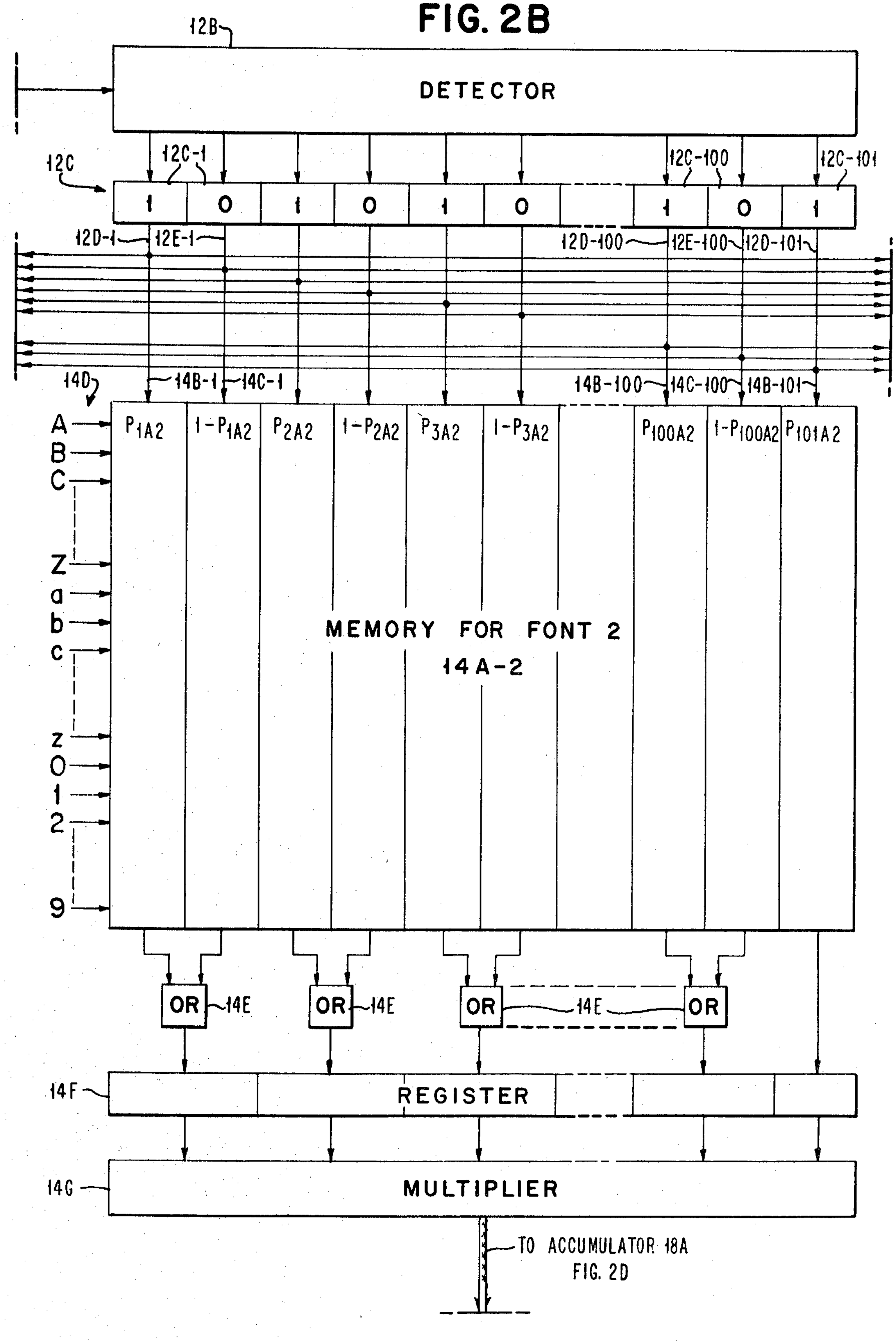
Figure 2C:
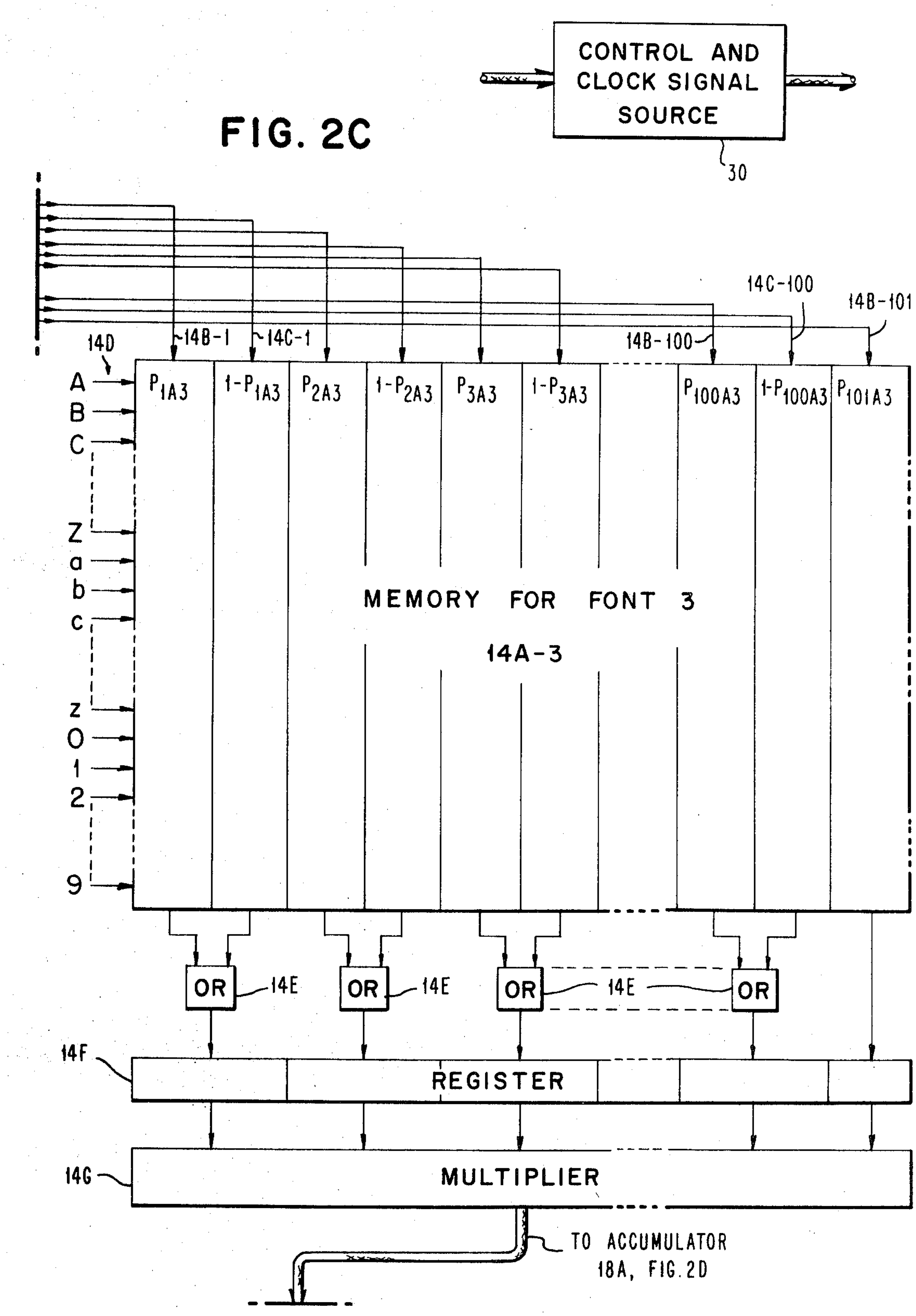
Figure 2D:
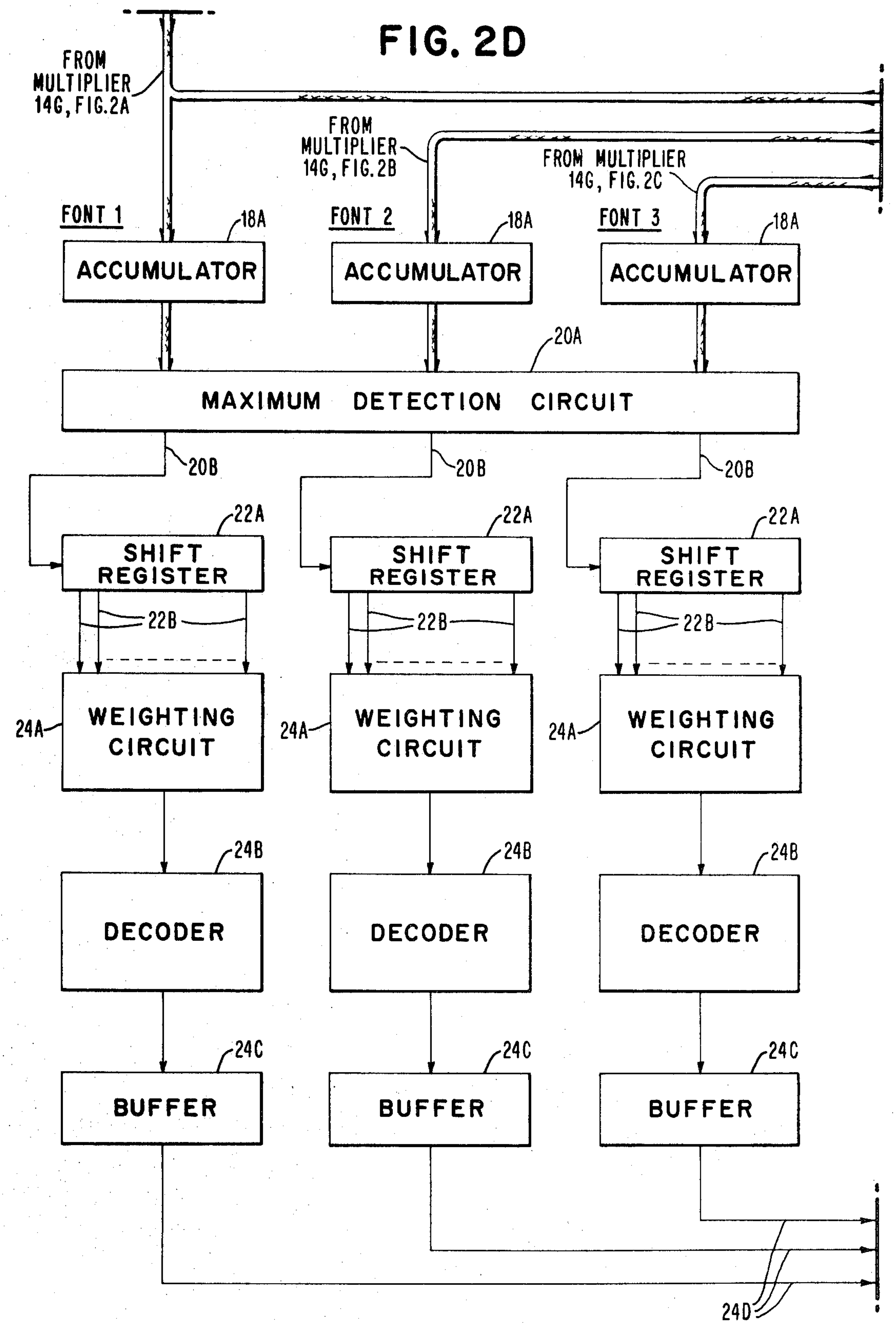
Figure 2E:
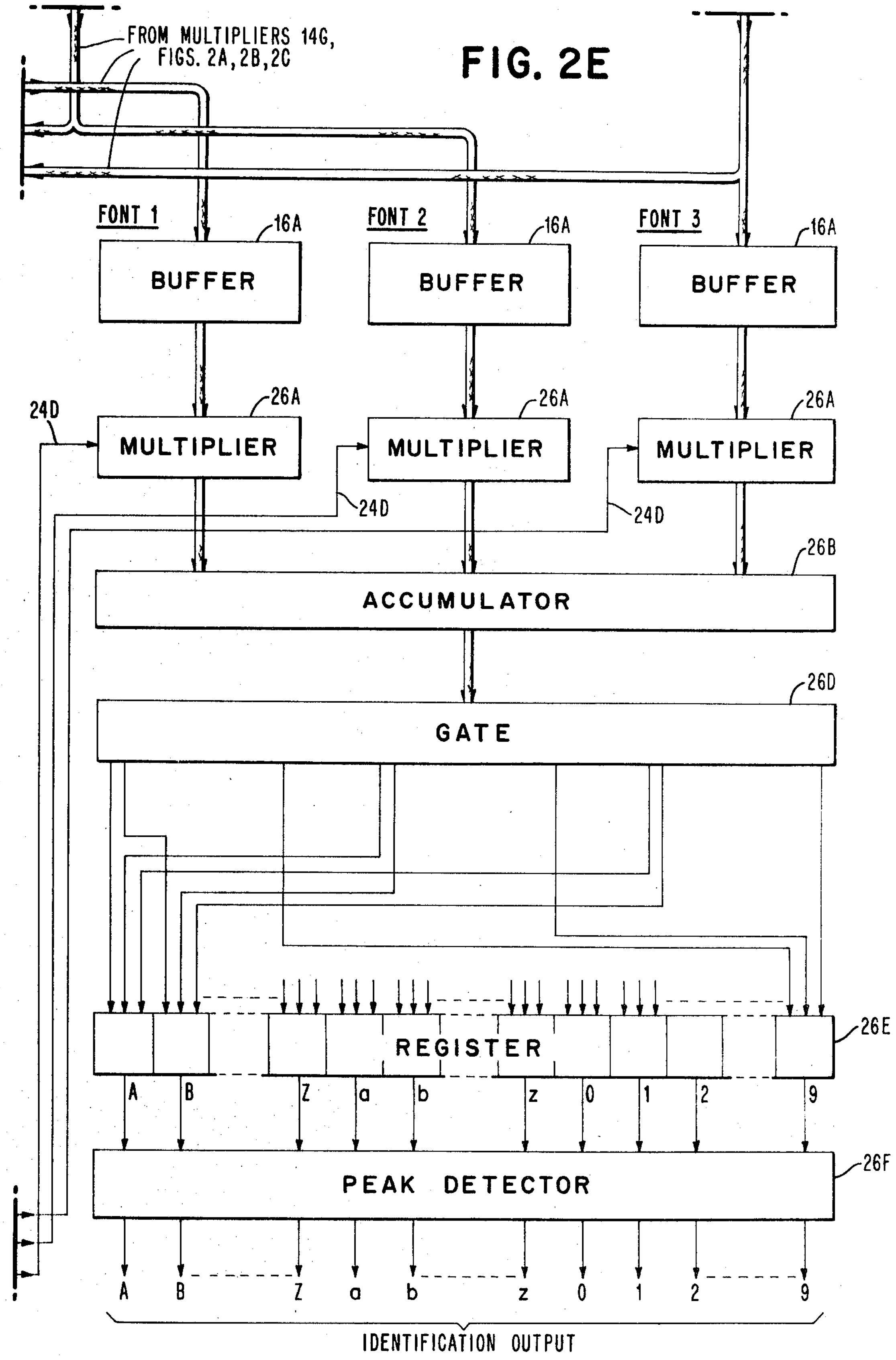

Each product, representing a character comparison function developed in multiplier 14G is transferred both to an accumulator 18A (FIG. 2D), and in parallel to a buffer 16A in FIG. 2E. The above-described readout and multiplication operation is repeated for the other 61 known characters in the set to develop 61 more products. Each of these products is a character comparison function for the unknown character, whose binary representation is stored in register 12C, as compared against the stored representation of one of the known character in the set.

The products for the three fonts are accumulated in accumulator 18A (FIG. 2D) and after the completion of the accumulation of the 62 products, the three accumulated sums, representing the combined character comparison functions for the three fonts are applied to a maximum detection circuit 20A. This circuit determines which of the three sums in accumulators 18A is greatest and thereby determines the font for the unknown character. After each font determination, a binary one representing signal output is generated on an appropriate one of the output lines 20B of the maximum detection circuit 20A and applied as an input to the appropriate one of three shift registers 22A.

Each of the shift registers 22A is a 101 position shift register and stores the results of the last 101 font determinations, ignoring for the moment the initial and final stages of operation when the first and last 100 unknown characters in the sequence of unknown characters are scanned and processed to determine their font. After each font determination by circuit 20A, the shift registers 22A are advanced one position to the right so that a one is fed into one of the shift registers and is registered in the lowermost position and zeros are registered in the lowermost positions of the other two shift registers. At the same time the values in the highest positions of the shift registers, one binary one and two binary zeros, are shifted out of the registers and not recovered.

Therefore, ignoring the initial and final stages of operation, the three shift registers 22A continuously store the results of the last 101 font determinations. Assuming that circuit 20A always identifies one font for each character, (no rejects) there will always be 101 binary ones distributed through the three shift registers and these binary ones are stored in positions based upon the particular font determinations for characters in that position in the sequence.

Each of the shift registers 22A has 101 output lines 22B, one for each of the stages in the shift register, and these lines provide output signals indicating whether the particular stage is then storing a binary one or binary zero. These signals are applied to three weighting circuits 24A, the function of which is to give more weight to the binary ones centrally located in the shift registers. The precise manner of weighting may vary with the application. Here the 11 centrally located positions in each shift register (positions 46 through 56) are summed to determine how many binary ones are present and this sum is doubled. The other binary ones in the shift register are added to this doubled sum to obtain a single sum representative of the weighted values in each of the three fonts for the last 101 font determinations.

The outputs of the three shift registers are fed to three decoders 24B which translate the values developed by weighting circuits 24A into font frequency functions which are used in the actual character identification. The font frequency functions are transferred from decoders 24B to three buffers, which are used to control timing, and are then transferred via lines 24D and applied as inputs to three multipliers 26A shown in FIG. 2E. The timing provided by the buffers 24C is such that the three font frequency functions are applied as inputs to multipliers 26A at the same time as the character comparison functions developed for the 51st character in the sequence of 101 characters, the font determinations for which were used to develop the particular font frequency functions.

The character comparison functions for each unknown character, as described above, are the 62 products in each font which are produced by multiplier 14G (FIGS. 2A, 2B and 2C). These products are transferred to the accumulators 18A (FIG. 2D) for use in the font frequency determinations described above and also to the buffers 16A shown in FIG. 2E. The 62 character comparison functions for each unknown character in each of the three fonts are transferred to the three buffers where they are stored to allow time for the font determinations for the 50 characters succeeding the particular unknown character in the sequence, and the development of the font frequency functions based upon these font determinations as well as those for the particular unknown character and for the 50 characters preceding it in the sequence.

The 186 character comparison functions (62 for each font) are transferred from the buffers 16A to the three multipliers 26A. The three character comparison functions for the same character in the three fonts are multiplied by the font frequency functions and applied to an accumulator 26B. Each multiplication produces a modified character comparison function and the three functions for each of the 62 characters are accumulated in sequence in the accumulator 26B.

After accumulation of the sum for each character, based upon the modified comparison functions in all three fonts, the sum is directed through a gate 26D to a position in a register 26E. When all of the 62 sums from accumulator 26B have been developed and transferred to register 26E, they are applied to a peak detector circuit 26F which identifies the largest sum and provides an output which identifies the particular unknown character.

It is clear from the above description that the actual character identification is based upon the information derived from the comparison of the unknown character with the characters recorded in all of the three fonts. Thus, the values entered into register 26E are the 62 sums of the modified character comparison functions for each of the 62 characters in the set. It has been found that this type of identification using all of the font information is advantageous in producing more reliable character identification. Of course, the character information in each font is modified by the font frequency functions before the summation and peak detection.

The operation of the system is essentially the same for the first and last 100 characters in the sequence of characters to be identified. The primary difference follows from the fact that the number of font determinations from which the font frequency functions are derived is less than the 101 determinations described above.

The shift registers 22A (FIG. 2D) are reset to zero prior to the initiation of operations. The font character in the sequence is identified using font frequency functions developed from font determinations on the first 51 characters in the sequence; the font frequency functions in the second unknown character are derived from font determinations on the first 52 characters in the sequence, etc. The operation is similar during the last 50 character identifications, when zeros are fed into all three shift registers 22A since after the first identification for the last character there are no succeeding characters.

The control and clock source necessary to apply the control and clock signals to the various components in the system is represented by block 30 in FIG. 2C. The control source both applies signals to cause the operations to be reformed in sequence as described, and receives signals from the various components indicating that a particular operation has been completed. The actual lines connecting control and clock signal source 30 to each of the functional components in the system have been omitted in the interests of avoiding over complicating the drawings. This control source can be a control source which is specifically designed to deliver only the control pulses necessary to the operation of the system shown in the mode described or it may be a source which is itself controllable to deliver signals to modify the mode of operation in ways similar to those described below. By use of this flexible approach, the various operations may be modified to suit the application. For example, using this type of control, the weighting functions (blocks 24A in FIG. 2D) may be modified or eliminated to suit the particular application.

Various other modifications of the above-described system may be easily made to adapt the system to the degree of sophistication required by the particular application. Thus, it is immediately clear that the inputs applied to the multipliers 26A in FIG. 2E, instead of producing a multiplication for each font, may merely select a particular one of the fonts and the identification would then be made only on the 62 character comparison functions in the selected font. In such a case, the multipliers 26A would either serve as gates, or be replaced by appropriate gates, and the accumulator 26B would not be required.

It is also evident that the method may be practiced using a rescanning type of technique in which the font determinations are made first, the statistics on such determination stored to derive the desired font frequency functions, and thereafter the characters could be scanned and directly identified from the scanned information using the previously obtained information on the fonts.

One particularly important feature of the method and system, as described specifically above, is that it can be employed to recognize characters recorded in a font other than the three fonts on which information is stored in the machine. The adaptive mode of operation with the continuous development of the font frequency functions lends itself to this type of operation. The accuracy of the system when operated in this mode increases if the number of fonts on which information is stored in the machine is increased.

Finally, as is evident to one skilled in the art, the particular system shown in FIGS. 2A through 2E employs a large degree of parallelism and a relatively large number of circuits which perform mathematical functions. It is not necessary that these functions be performed in parallel for they can be very obviously performed by controlling a single arithmetic unit to carry out the various multiplication and accumulation steps necessary to the practice of the process. The choice of the particular apparatus which is used in the practice of the process depends, as usual, on the economic factors involved. As parallelism is increased by the use of special purpose equipment, the speed and efficiency of the operation is also increased but usually so is the cost of the apparatus.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A machine method of identifying different specimens from a sequence of specimens in a number of different styles comprising the steps of;

a. obtaining a representation of each of a plurality of unknown specimens in the sequence of specimens to be identified;

b. comparing each unknown specimen representation with a plurality of representations of known specimens in each of a number of different styles;

c. determining from comparisons for each unknown specimen an identification of the style of the unknown specimen without at that time identifying the specimen;

d. deriving from a series of the style determinations frequency functions for each of said styles corresponding to the number of times that each of said styles occur within a selected interval of said sequence around each of the unknown specimens; and then e. identifying each unknown specimen from a comparison of a representation of that specimen with representations of known specimens to produce comparison indications for each style of the known specimens, with said comparison indications for each style being varied in accordance with the magnitude of the corresponding frequency function derived for that style.

2. The method of claim 1 wherein said specimens are different characters and said styles are different fonts.

3. The method of claim 1 wherein each unknown specimen is identified using frequency functions derived from the style determinations of that specimen and style determinations over said selected interval of said sequence around that specimen including a number of specimens preceding that specimen and a number of characters succeeding that specimen in the sequence of specimens to be identified.

4. The method of claim 3 wherein said frequency functions used in each unknown specimen identification are derived from the style determinations of a number of specimens preceding and succeeding the particular unknown specimen in the sequence with more weight being given to the style determination for specimens near the particular unknown specimen in the sequence than for specimens further removed from the particular unknown specimen in the sequence.

5. The method of claim 1 wherein each said unknown specimen is identified by a comparison of the representation of that specimen with the representations of the known specimens in a particular one only of one of the styles using the frequency function corresponding to the particular one only of the styles.

6. The method of claim 1 wherein in step b the representation of each unknown specimen in individually compared with representations of each known specimen in each style, and the results of all the comparisons are combined for each style to make the style determination of step c.

7. The method of claim 6 wherein the results of each individual comparison in step b of the unknown specimen with each specimen in each style is stored in a buffer, and it is these results which are the comparison indications varied in step e in accordance with the magnitude of the frequency functions corresponding thereto.

8. The method of claim 7 wherein during said specimen identification step the comparison indications of the individual comparisons between the unknown specimen and the same specimen in each of the different styles are combined after being varied in accordance with the magnitude of the respective frequency functions to identify the particular unknown specimen.

9. A machine method of identifying characters in a sequence of characters which may be recorded in a number of different fonts;

a. scanning each unknown character in the sequence to obtain representations of each unknown character to be identified;

b. individually comparing the representations of each unknown character with stored representations of all the known characters in each of a plurality of different fonts to obtain a respective plurality of character comparison functions, one for each stored known character in each font, said functions being indicative of the extent to which the respective representations of the known characters compare with the representations of the unknown characters;

c. for each unknown character combining the respective character comparison functions for each font to obtain a plurality of font indications, one for each font, said indications being indicative of the combined relative extent to which representations of each unknown character compare with the respective representations of each known character in each font;

d. for each unknown character determining from the font indications the font for the unknown character;

e. deriving from a series of font determinations made for a series of unknown characters in sequence font frequency functions for each font, said font frequency functions being indicative of the number of times each of the respective fonts occur over a given number of characters in said sequence;

f. using the font frequency functions for each font to vary in accordance therewith the corresponding character comparison functions obtained for the unknown characters by comparison with known characters in that font so as to vary the extent of the likelihood that each of the unknown characters belong to the respective fonts;

g. and identifying unknown characters by determining which of the character comparison functions, as varied, indicates that the known character corresponding thereto is most representative of the corresponding unknown character.

10. A machine method of identifying characters;

a. scanning a plurality of characters in a sequence of characters to be identified to obtain representations of each of said characters;

b. comparing each said representation of an unknown character with stored representations of a plurality of known characters in a number of different fonts to determine the font for the unknown character without at that time identifying the character;

c. deriving from a plurality of the font determinations font frequency functions for each of said different fonts indicative of the relative number of times each font occurs within said plurality of characters;

d. and identifying each character from indications for each font obtained by comparing a represention of the unknown character with stored representations of known characters with said indications for each font being respectively varied in accordance with the number of times the corresponding font occurs according to the respective said font frequency functions for each of said different fonts, said font frequency functions being derived from the font determinations for the unknown character and and a number of other characters immediately preceding and succeeding the unknown character forming said plurality of characters in said sequence of characters to be identified.

11. A multifont character recognition system comprising;

a. means for scanning a plurality of unknown characters to be identified to obtain a multiorder binary word for each character;

b. means storing representations of all the known characters in each of a number of different fonts;

c. means for comparing said stored representations with said binary word to obtain a plurality of character comparison functions, one for each character in each font, said functions being indicative of the extent to which the respective representations of the known characters compare with said unknown characters, as represented by said binary word;

d. buffer storage means for separately storing said character comparison functions by font;

e. means for summing the character comparison functions for each unknown character in each font;

f. means for comparing said summed character comparison functions for each font to determine from the relative values thereof the font for the character;

g. register means for storing by font the result of the font determinations;

h. and means coupled to said buffer storage means and to said register means to cause the respective character comparison functions stored by font in said storage means to be varied in accordance with the number of the respective font determinations stored by font in said register means.

* * * * *